US006665865B1

(12) United States Patent
Ruf

(10) Patent No.: US 6,665,865 B1

(45) Date of Patent: Dec. 16, 2003

(54) EQUIVALENCE CLASS BASED SYNCHRONIZATION OPTIMIZATION

(75) Inventor: Erik Ruf, Redmond, WA (US)

(73) Assignee: Microsoft Corporation, Redmond, WA (US)

(*) Notice: Subject to any disclaimer, the term of this patent is extended or adjusted under 35 U.S.C. 154(b) by 0 days.

(21) Appl. No.: 09/560,286

(22) Filed: Apr. 27, 2000

(51) Int. Cl.[7] ................................................ G06F 9/45

(52) U.S. Cl. ....................... 717/157; 717/151; 717/154; 717/156; 717/144

(58) Field of Search ................................ 717/144, 151, 717/157, 156, 154

(56) References Cited

U.S. PATENT DOCUMENTS

| | | | | | |
|---|---|---|---|---|---|
| 5,488,727 | A | * | 1/1996 | Agrawal et al. | 717/154 |
| 6,014,518 | A | * | 1/2000 | Steensgaard | 717/154 |
| 6,041,179 | A | * | 3/2000 | Bacon et al. | 717/116 |
| 6,173,444 | B1 | * | 1/2001 | Archambault | 717/159 |
| 6,434,740 | B1 | * | 8/2002 | Monday et al. | 717/108 |
| 6,463,581 | B1 | * | 10/2002 | Bacon et al. | 717/154 |

OTHER PUBLICATIONS

"Topics in Online Partial Evaluation", Erik Ruf, Technical Report: CSL–TR–93–563, Stanford University, 1993.*

"Context–Intensive Alias Analysis Reconsidered", Erik Ruf, Technical Report: MSR–TR–95–20, Microsoft Research, 1995.*

"Removing Unnecessary Synchronizaion in Java", Jeff Bogda and Urs Holzle, University of California, 1999.*

"Effective Syncronization Removal for Java", Erik Ruf, Microsoft Research, 2000.*

Steven S. Muchnick, "Advanced Compiler Design and Implementation", *Morgan Kaufmann*, 1997, Chapter 8, 217–266.

* cited by examiner

*Primary Examiner*—Todd Ingberg
*Assistant Examiner*—Kenneth A Gross
(74) *Attorney, Agent, or Firm*—Woodcock Washburn LLP

(57) ABSTRACT

Synchronization optimization for statically compiled Java programs is performed in three phases: Thread closure analysis, Alias analysis, and Specialization and transformation. Thread closure analysis bounds the number of thread instances constructed at each thread allocation site, and determines the set of methods potentially executed by each thread instance. Alias analysis generates equivalence class representation based alias signatures for each method. These signatures describe the aliasing and synchronization behavior of each method. The specialization and transformation phase traverses a call graph in a top-down manner starting from the program entry point, and creates specialized copies of methods when they can be individually optimized. A synchronization operation is removed from the code whenever it can be proven that all objects reaching the operation at runtime can be synchronized by at most one thread instance.

30 Claims, 5 Drawing Sheets

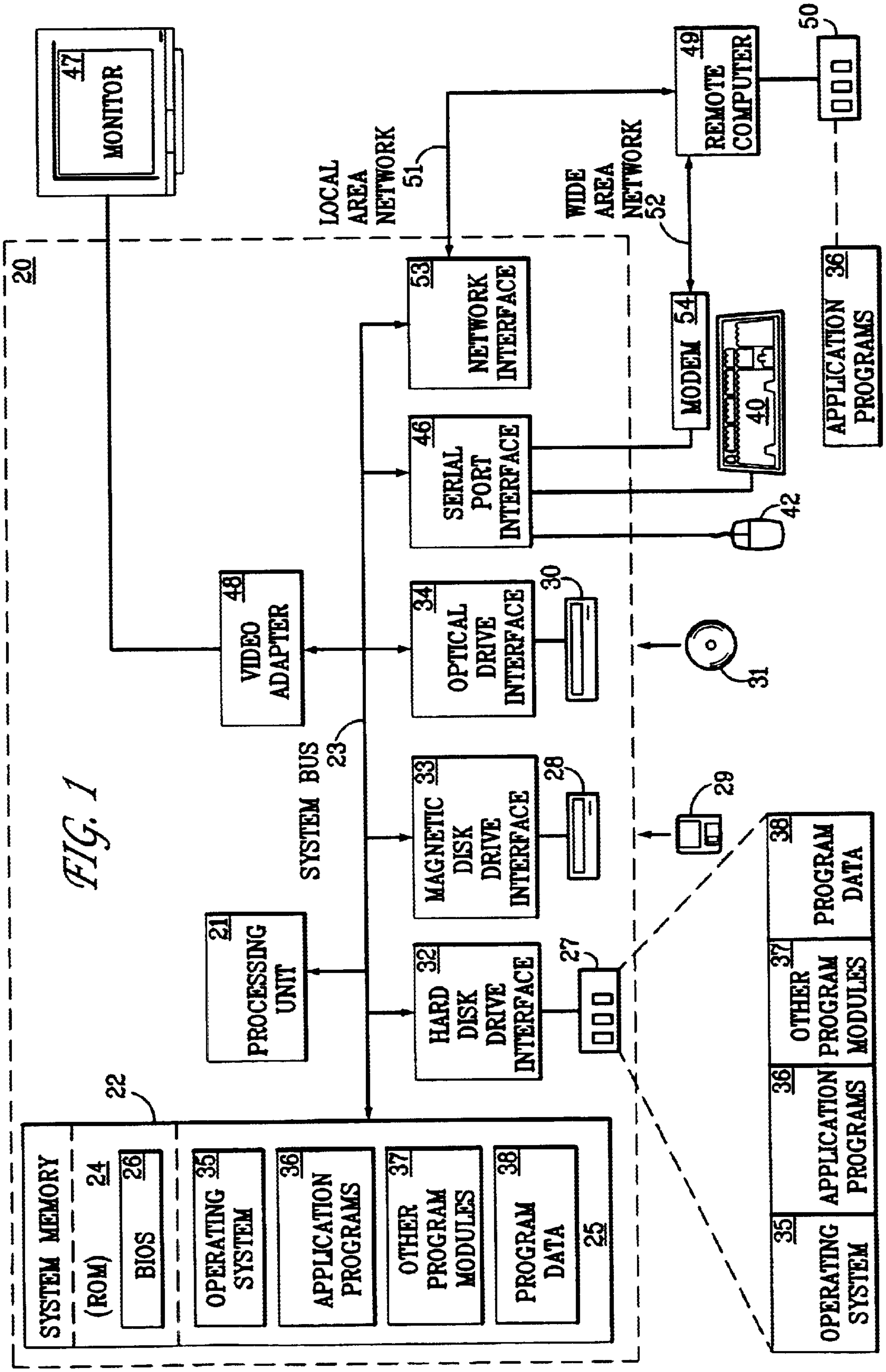
FIG. 1
20
SYSTEM MEMORY
(ROM) 24
BIOS 26
22
OPERATING SYSTEM 35
APPLICATION PROGRAMS 36
OTHER PROGRAM MODULES 37
PROGRAM DATA 38
25
PROCESSING UNIT 21
SYSTEM BUS 23
HARD DISK DRIVE INTERFACE 32
MAGNETIC DISK DRIVE INTERFACE 33
OPTICAL DRIVE INTERFACE 34
SERIAL PORT INTERFACE 46
NETWORK INTERFACE 53
VIDEO ADAPTER 48
MONITOR 47
27
28
29
30
31
40
42
MODEM 54
LOCAL AREA NETWORK 51
WIDE AREA NETWORK 52
REMOTE COMPUTER 49
50
APPLICATION PROGRAMS 36
OPERATING SYSTEM 35
APPLICATION PROGRAMS 36
OTHER PROGRAM MODULES 37
PROGRAM DATA 38

```
class SimpleVector {
  Object[] elements;
  static SimpleVector v;

/* invoked by T1, T2 */
static void <init> (SimpleVector this1) {
  Object[] temp = new Object[10]:
  this1.elements = temp;
}

/* invoked by T1, T2 */
static Object elementAt (SimpleVector this2,
                         int index) {
  monitorEnter(this2)
  try {
    Object[] elts = this2.elements;
    Object elt = elts[index];
    monitorExit(this2);
    return elt;
  }
  catch(Throwable t) {
    monitorExit(this2);
    throw t;
  }
 }
}

/* invoked by T1 */
static void test1() {
  SimpleVector v1 = new SimpleVector;
  SimpleVector.<init>(v1);
  Object o1 = SimpleVector.elementAt(v1, 0);
}

/* invoked by T1 */
static void test2() {
  SimpleVector v2 = new SimpleVector;
  SimpleVector.<init>(v2);
  Object o2 = SimpleVector.elementAt(v2, 0);
  SimpleVector.v = v2;
}

/* invoked by T2 */
static void test3() {
  SimpleVector v3 = SimpleVector.v;
  Object o3 = SimpleVector.elementAt(v3, 0);
  monitorEnter(o3);
  try {
    ...
    monitorExit(o3);
    return;
  }
  catch(Throwable t) {
    monitorExit(o3);
    throw t;
  }
}
```

FIG. 7

EQUIVALENCE CLASS BASED SYNCHRONIZATION OPTIMIZATION

FIELD OF THE INVENTION

This invention relates generally to the field of computers, and in particular to alias analyses useful for optimizing software.

COPYRIGHT NOTICE/PERMISSION

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software and data as described below and in the drawing hereto: Copyright® 2000, Microsoft Corporation, All Rights Reserved.

BACKGROUND

As is known to those skilled in the art, JAVA™ is an object-oriented language developed by Sun Microsystems, Inc.

Java libraries include synchronization operations throughout. Synchronization operations in Java acquire and release locks associated with or belonging to Java objects. The operations of acquiring or releasing locks are typically expensive in terms of added execution time, and so single threaded libraries and multithreaded libraries are often supplied so that users can link to the single threaded libraries to avoid the synchronization operations when appropriate. There is also a storage allocation cost associated with a lock. Even when the multithreaded libraries are used, many unnecessary synchronization operations, and their associated overhead exist.

Typical approaches to find ways to remove synchronization operations that are not necessary include: 1) determining if a program is single threaded, and if so, removing all synchronization operations; 2) and escape analysis. A program can be determined to be single threaded by searching for any thread creation sites, and then declaring the program single threaded if none are found. Since, in a single threaded program, only one thread runs at a time, all synchronization operations can be removed. This approach is not without problems. Notification operations that operate through locked objects can occur in either single threaded or multi threaded programs. The semantics of Java require that a thread issuing a notification be synchronized on the object at issue. If synchronization operations have been removed, and a notification operation takes place, an exception can be thrown, possibly causing the program to crash.

A second approach is escape analysis. If an object never escapes the thread in which it is created, then it cannot be accessed by a separate thread, and any synchronization operations on the object can be removed. If an object does escape from the thread in which it is created, then there is a possibility that a separate thread may try to synchronize it. This is not to say that multiple threads can never execute the same piece of code. If multiple threads execute the same piece of code but the object does not escape, then each thread has a separate instance of the object, and lock contention is not a concern.

An object escapes from a thread when it can be transitively referenced by a global object. An escaping object is thus accessible by multiple threads, which may contend for its lock. Escape analysis is very conservative. Even if an object can be accessed by a global variable, it's possible that it is not. Also, even if an object is accessed, it may not be locked. This results in a conservative estimate, in that an assumption is made that the escaped object is synchronized elsewhere, when in fact it may not be.

Thus, an alternate method and apparatus are needed for optimizing synchronization operations from Java code.

SUMMARY OF THE INVENTION

The method and apparatus of the present invention provide a mechanism for performing an alias analysis on a program using a compact, equivalence-class-based representation that eliminates the need for fixed point operations. In one embodiment, the mechanism is used to remove unnecessary synchronization operations from statically compiled Java programs.

In general, the mechanism provides a method for determining if a thread can perform an action of interest on an object of interest. The action can be any type of action, such as a synchronization operation in a Java program. The method includes performing a thread closure analysis to determine the closure of code potentially executed by the thread, performing an alias analysis for each procedure in the closure of code to determine a polymorphic summary of each procedure, and utilizing the polymorphic summary to specialize each procedure in the closure of code. The program statements in the procedures are walked and searched for occurrences of the action of interest performed on objects represented by the same equivalence class representative as the object of interest. When these actions of interest are found, they can be optimized separately for each specialized copy of each procedure.

The polymorphic summaries include alias sets that describe the aliasing behavior of formal parameters at the procedure boundary. Alias sets include attribute fields that describe the action of interest. In one embodiment of the invention, the attribute fields include fields that describe whether the object of interest is synchronized, by what threads, and whether the object is reachable by a global value. In other embodiments, a "notified" field is included as an attribute field. The notified field allows synchronizations to be optimized out of Java programs while still allowing notification operations to perform correctly.

BRIEF DESCRIPTION OF THE DRAWINGS

FIG. 1 is a block diagram of a computer system on which the present invention may be implemented.

FIG. 7 is example code to demonstrate synchronization optimization.

DETAILED DESCRIPTION

Figure 2:
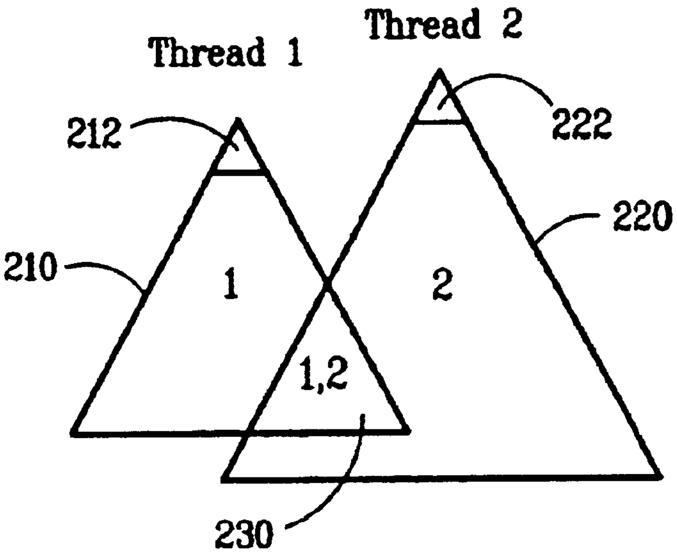
FIG. 2 is a symbolic diagram of two threads after the completion of thread closure analysis.

In the following detailed description of exemplary embodiments of the invention, reference is made to the accompanying drawings which form a part hereof, and in which is shown by way of illustration specific exemplary embodiments in which the invention may be practiced. These embodiments are described in sufficient detail to enable those skilled in the art to practice the invention, and it is to be understood that other embodiments may be utilized and that logical, mechanical, electrical and other changes may be made without departing from the spirit or scope of the present invention. The following detailed description is, therefore, not to be taken in a limiting sense, and the scope of the present invention is defined only by the appended claims.

The detailed description is divided into multiple sections. A first section describes the operation of a computer system which implements the current invention. This is followed by a high level description of how synchronization constructs are optimized out of Java programs using a polymorphic summary-based alias analysis. Further detail regarding the operations of the synchronization optimization is then described.

Hardware and Operating Environment

FIG. 1 provides a brief, general description of a suitable computing environment in which the invention may be implemented. The invention will hereinafter be described in the general context of computer-executable program modules containing instructions executed by a personal computer (PC). Program modules include routines, programs, objects, components, data structures, etc. that perform particular tasks or implement particular abstract data types. Those skilled in the art will appreciate that the invention may be practiced with other computer-system configurations, including hand-held devices, multiprocessor systems, microprocessor-based programmable consumer electronics, network PCs, minicomputers, mainframe computers, and the like which have multimedia capabilities. The invention may also be practiced in distributed computing environments where tasks are performed by remote processing devices linked through a communications network. In a distributed computing environment, program modules may be located in both local and remote memory storage devices.

FIG. 1 shows a general-purpose computing device in the form of a conventional personal computer 20, which includes processing unit 21, system memory 22, and system bus 23 that couples the system memory and other system components to processing unit 21. System bus 23 may be any of several types, including a memory bus or memory controller, a peripheral bus, and a local bus, and may use any of a variety of bus structures. System memory 22 includes read-only memory (ROM) 24 and random-access memory (RAM) 25. A basic input/output system (BIOS) 26, stored in ROM 24, includes the basic routines that transfer information between components of personal computer 20. BIOS 26 also includes start-up routines for the system. Personal computer 20 further includes hard disk drive 27 for reading from and writing to a hard disk (not shown), magnetic disk drive 28 for reading from and writing to a removable magnetic disk 29, and optical disk drive 30 for reading from and writing to a removable optical disk 31 such as a CD-ROM or other optical medium. Hard disk drive 27, magnetic disk drive 28, and optical disk drive 30 are connected to system bus 23 by a hard-disk drive interface 32, a magnetic-disk drive interface 33, and an optical-drive interface 34, respectively. The drives and their associated computer-readable media provide nonvolatile storage of computer-readable instructions, data structures, program modules and other data for personal computer 20. Although the exemplary environment described herein employs a hard disk, a removable magnetic disk 29 and a removable optical disk 31, those skilled in the art will appreciate that other types of computer-readable media which can store data accessible by a computer may also be used in the exemplary operating environment. Such media may include magnetic cassettes, flash-memory cards, digital versatile disks, Bernoulli cartridges, RAMs, ROMs, and the like.

Program modules may be stored on the hard disk, magnetic disk 29, optical disk 31, ROM 24 and RAM 25. Program modules may include operating system 35, one or more application programs 36, other program modules 37, and program data 38. A user may enter commands and information into personal computer 20 through input devices such as a keyboard 40 and a pointing device 42. Other input devices (not shown) may include a microphone, joystick, game pad, satellite dish, scanner, or the like. These and other input devices are often connected to the processing unit 21 through a serial-port interface 46 coupled to system bus 23; but they may be connected through other interfaces not shown in FIG. 1, such as a parallel port, a game port, or a universal serial bus (USB). A monitor 47 or other display device also connects to system bus 23 via an interface such as a video adapter 48. In addition to the monitor, personal computers typically include other peripheral output devices (not shown) such as speakers and printers.

Personal computer 20 may operate in a networked environment using logical connections to one or more remote computers such as remote computer 49. Remote computer 49 may be another personal computer, a server, a router, a network PC, a peer device, or other common network node. It typically includes many or all of the components described above in connection with personal computer 20; however, only a storage device 50 is illustrated in FIG. 1. The logical connections depicted in FIG. 1 include local-area network (LAN) 51 and a wide-area network (WAN) 52. Such networking environments are commonplace in offices, enterprise-wide computer networks, intranets and the Internet.

When placed in a LAN networking environment, PC 20 connects to local network 51 through a network interface or adapter 53. When used in a WAN networking environment such as the Internet, PC 20 typically includes modem 54 or other means for establishing communications over network 52. Modem 54 may be internal or external to PC 20, and connects to system bus 23 via serial-port interface 46. In a networked environment, program modules, such as those comprising Microsoft® Word which are depicted as residing within 20 or portions thereof may be stored in remote storage device 50. Of course, the network connections shown are illustrative, and other means of establishing a communications link between the computers may be substituted.

Software may be designed using many different methods, including object oriented programming methods. C++ and Java are two examples of common object oriented computer programming languages that provide functionality associated with object oriented programming. Object oriented programming methods provide a means to encapsulate data members (variables) and member functions (methods) that operate on that data into a single entity called a class. Object oriented programming methods also provide a means to create new classes based on existing classes.

An object is an instance of a class. The data members of an object are attributes that are stored inside the computer memory, and the methods are executable computer code that act upon this data, along with potentially providing other services. The notion of an object is exploited in the present invention in that certain aspects of the invention are implemented as objects in one embodiment.

An interface is a group of related functions that are organized into a named unit. Each interface may be uniquely identified by some identifier. Interfaces have no instantiation, that is, an interface is a definition only without the executable code needed to implement the methods which are specified by the interface. An object may support an interface by providing executable code for the methods specified by the interface. The executable code supplied by the object must comply with the definitions specified by the interface. The object may also provide additional methods. Those skilled in the art will recognize that interfaces are not limited to use in or by an object oriented programming environment.

Alternative Embodiments and Further Detail

The method and apparatus of the present invention provide a mechanism for performing an alias analysis on a program using a compact, equivalence-class-based representation that eliminates the need for fixed point operations. The analysis determines if a thread of interest can perform an action of interest on an object of interest. In one embodiment, the mechanism is used to remove unnecessary synchronization operations from statically compiled Java programs. The present invention provides benefits over escape analysis alone, in part because it can eliminate synchronization operations even on objects that escape their allocating threads.

The method and apparatus of the present invention is generally described herein with reference to an embodiment for providing synchronization optimization in a Java program. Although many other embodiments exist, and some are mentioned and discussed below, this detailed description primarily discusses the Java synchronization optimization embodiment so as to provide a concrete example for purposes of explanation.

The Java Synchronization optimization embodiment can be viewed as involving three phases:

Phase 1: Thread Closure Analysis;

Phase 2: Alias Analysis; and

Phase 3: Specialization and Transformation.

Thread closure analysis identifies thread allocation sites (including an artificial allocation site for the main thread) and computes two attributes for each site: 1) the set of methods potentially executed by the thread, and 2) whether the allocation site can be executed more than once at runtime.

Alias analysis determines the aliasing behavior of each method in the program. "Aliasing behavior" is a term used to describe whether any part of a formal variable or return value is reachable by: 1) any part of another formal variable or return value; or 2) a global object. The alias analysis is performed on methods in a bottom up order relative to a call graph that describes the "calling" order of methods in the program. When complete, the alias analysis produces a summary of each method's potential aliasing behavior and also produces data structures showing potential aliasing properties of global objects. The method summaries are polymorphic in that they describe a method's aliasing behavior in a form that is independent of any particular call site.

Specialization and transformation refers to the process of traversing the call graph from the top down, and determining, for each location in the program where a method is invoked, whether the method can be optimized. If a method can be optimized differently for different invocations of the method, then the polymorphic summary for the method is used to make a "specialized" version of the method, and the specialized version is then "transformed" (optimized).

The combination of the three phases provides explicit modeling of inter-thread object flow. Instead of preserving all synchronization on escaping objects, the three phase synchronization optimization finds cases where an object is synchronized only by a single thread (not necessarily its creating thread) during program execution, and eliminates synchronization for this case. This additional precision also proves useful in single-threaded programs, programs that synchronize on values reachable from static variables, and cases where imprecision in the alias analysis causes spurious aliasing with escaping values. Each of the three phases is now treated in greater detail, and illustrated with specific examples.

PHASE 1: Thread Closure Analysis

Thread closure analysis associates pieces of code with threads that can execute them. Stated differently, thread closure analysis determines which methods can be invoked by which threads. The analysis finds "thread allocation sites" in the program. Each thread allocation site can correspond to one thread or multiple threads in the program at runtime. Part of the analysis involves determining whether more than one thread object can be created from a single thread allocation site.

A thread class is defined in Java. A thread allocation site is defined as a site in a program where a Thread object is created. For example, the statement T=new MyThread;

is a thread allocation site that allocates thread T of type MyThread. For an object T, the method T.start starts the run method defined in the thread class. When a user defines a class as a subclass of class Thread, the run method can be overridden. For example, if MyThread is a subclass of class Thread, then the user has the option of overriding the run method of the Thread class. When the run method is overridden, then the run method for the subclass is run.

The thread object can also be created with a "runnable" object passed in, as in

T=new Thread(runnable);

When the runnable object is specified, it determines what method is executed when the thread is started. For the purposes of this description, the term "run method" is used to describe the method invoked by the start method, regardless of whether a runnable object was specified when the thread object was created.

Thread closure analysis is performed as follows.

1. Find all thread allocation sites in the program.

2. If the thread allocation site allocates a thread object without a runnable object, the run method of the thread object is examined.

3. If the thread allocation site allocates a thread object with a runnable object, the method defined in the runnable object is examined.

For each thread, the thread closure analysis also determines whether a thread allocation site can be multiply executed. An allocation site is marked as multiply executed if it is in a loop, is reachable from a non-class-initialization method having multiple or multiply-executed call sites, or is reachable from the run method of a multiply executed thread allocation site. Thread objects created from thread allocation sites that are not marked as multiply-executed create singleton threads when started. The term "singleton thread" is used herein to describe a thread that can only be executed once.

Thread allocation sites can also be explicitly marked as being executed once. This can be useful in libraries maintained by library developers. When a library developer knows that a particular thread allocation will execute only once, the developer can specifically mark the thread allocation site as such. The thread closure analysis, upon reaching an explicitly marked thread allocation site, can mark the thread allocation site as a singleton thread site.

From the run method, the thread closure analysis traverses the call graph to determine which methods can be run by each thread. In one embodiment, each thread allocation site is identified with a number. Procedures executable by a thread corresponding to the thread allocation site are marked with the number. When this is complete, if a method is marked with more than one number, then the method can be executed by multiple threads. In other embodiments, different mechanisms are used to associate methods with one or more thread allocation sites. One skilled in the art will appreciate that any mechanism can be used to associate methods with thread allocation sites without departing from the scope of the present invention.

FIG. 2 shows a symbolic diagram of two threads after the completion of thread closure analysis. Each thread is capable of executing a subset of the code in the Java program. The subset executable by Thread1 is shown as subset 210, and the subset executable by Thread2 is shown as subset 220. The subsets are shown as triangles to suggest that a geometric progression of method calls is possible, but this is not necessary. A method can call any number of other methods.

Region 212 of subset 210 represents the run method for Thread1. The remainder of subset 210 represents methods called by run method 212, or methods transitively reached by run method 212. "Transitively reached," in this context, refers to a method called by the run method, or called by a method that is called by the run method, etc. If a method can be transitively reached by the run method of a thread, then the method can, but is not necessarily, executed within the thread.

Methods in subset 210 are marked with a unique number associated with the thread allocation site for Thread1. In the example of FIG. 2, methods within subset 210 are marked with the numeral "1." Likewise, methods in subset 220 are marked with the numeral "2," which is associated with the thread allocation site for Thread2. Region 222 represents the run method for Thread2, and subset 220 represents methods transitively reached by the run method for Thread2.

Region 230 represents the intersection of subsets 210 and 220. Methods within region 230 can be called by either Thread1 or Thread2, and are marked with numerals "1," and "2." FIG. 2 shows two threads having a single intersecting subset. This is a simplified case for illustration purposes. In practice, many threads can exist, with many intersecting subsets. There is no limit to the number of threads that can execute a method. For example, if region 230 represented the intersection of twenty threads rather than just two, each method within region 230 would be marked with twenty unique thread numbers.

As used above, the term "method" describes methods in object oriented programs, such as those written in Java. The method and apparatus of the present invention applies to Java as well as programs written in other languages. Other languages can implement "methods" as procedures, functions, or other entities. The term "procedure" is used below to describe portions of program code, and is meant to encompass all types of programs and programming languages.

PHASE 2: Alias Analysis

The alias analysis determines:

1. for each procedure, the alias and synchronization effects of the procedure and its (transitive) callees; and
2. for each global value (reference constant or static field) and its (transitive) fields and array elements, the set of allocation sites of threads potentially synchronizing the value.

A sample procedure is now presented to provide a framework for the discussion of the alias analysis, and then data structures that hold the above information are described.

Figure 3:
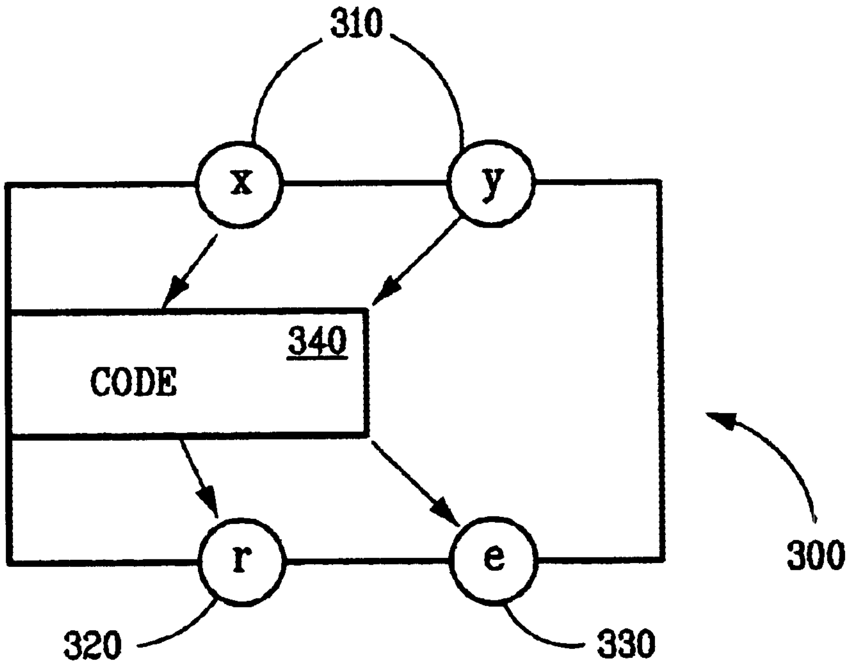
FIG. 3 is a conceptual diagram of a procedure having formal input parameters and return values.

FIG. 3 shows a conceptual diagram of a procedure having formal input parameters and return values. Procedure 300 can be any type of callable routine within a software environment. In the specific example being put forth, procedure 300 is an object method in a Java program. Procedure 300 is shown having formal input parameters 310 and return values 320 and 330. Two formal parameters "x," and "y," are shown as inputs to procedure 300, but any number can exist. Return value 320 represents a normal return value "r," and return value 330 represents an exception return value "e," both for a Java method. One skilled in the art will understand that when the method and apparatus of the present invention is applied to programming languages other than Java, a smaller or greater number of formal parameters and return values can exist.

Procedure 300 also includes code 340. Code 340 represents the software statements within procedure 300 that perform the work of the procedure. In performing the work of the procedure, code 340 can cause aliasing to occur. Specifically, any of formal input parameters 310 and return values 320 and 330 can be aliased to each other or to a global variable. For example, if within procedure 300, code 340 includes the following statements:

```
if (condition) then
  r=x;
else
  r=y;
endif
```

then r, x, and y, are aliased and procedure 300 is said to alias r, x, and y. Even though at any one time r can only take the value of either x or y, but not both, the fact that r can take either value at different times makes them potentially aliased. Aliasing behavior of program expressions and procedures is recorded in data structures as the alias analysis proceeds. These data structures are shown in FIGS. 4A and 4B and are described with reference thereto.

Figure 4A:
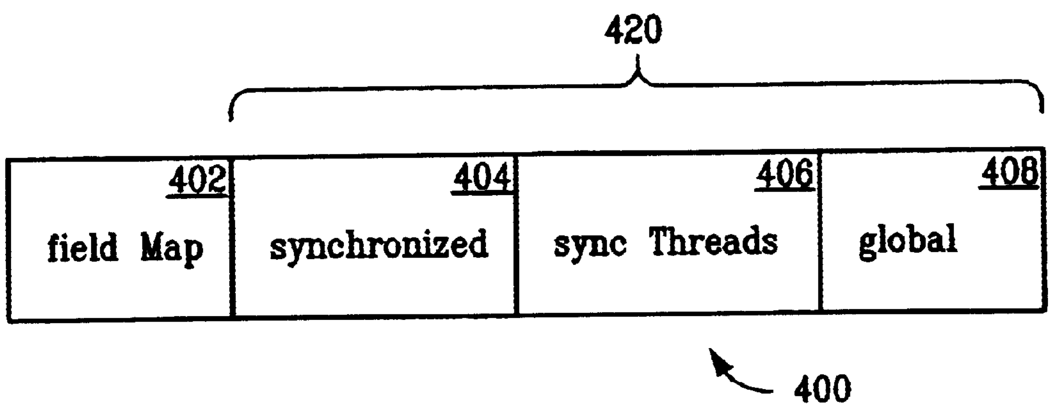
FIG. 4A is a diagram of an alias set embodiment.
Figure 4B:
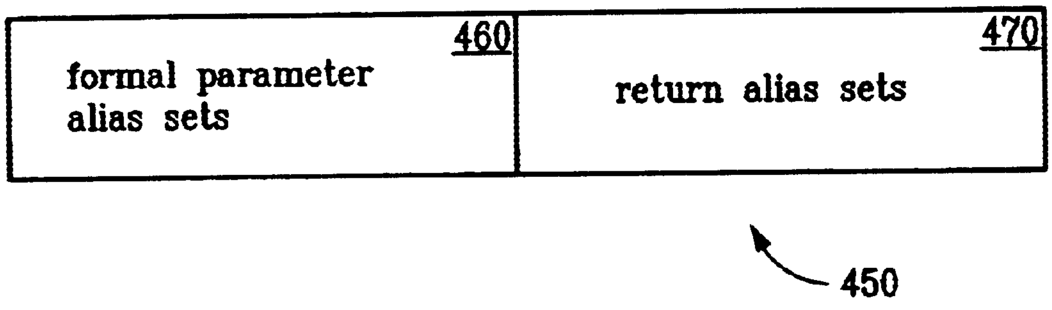
FIG. 4B is a diagram of an alias context embodiment.

FIG. 4A shows an embodiment of an alias set. Alias sets are used to model aliasing behavior of expressions in a program. AliasSet data structure 400 includes fields that describe the aliasing and synchronization properties of one or more expressions in the program, and can be described as:

aliasSet::=⊥|<fieldMap, synchronized, syncThreads, global>.

The ⊥ ("bottom") case indicates a nonreference value, while the tuple case describes a reference value. The tuple elements define properties of the value:

fieldMap: A mapping from fully qualified instance field names to alias sets for the corresponding field values; in one embodiment, the distinguished fieldname $ELT is used to denote the contents of an array object.

synchronized: A boolean, true if the value may be the target of a synchronization operation.

syncThreads: For escaping values, a set containing the thread allocation sites that may synchronize the value. An alias set is said to be contention free if its syncThreads set is empty or contains a single thread allocation site that executes at most once.

global: A boolean, if the value can be reached from a reference constant or static field (i.e., it escapes). If true, all alias sets reachable via fieldMap must also have global=true. This ensures that referents of an escaping object also escape.

AliasSet data structure 400 is an embodiment of an alias set that includes fieldMap field 402, synchronized field 404, syncThreads field 406, and global field 408. All fields other than fieldmap field 402 are part of attributes set 420. fieldMap field 402 models the aliasing behavior of expressions in the program, and fields included in attribute set 420 model properties of the set of aliased expressions. In the Java synchronization optimization embodiment, attributes set 420 includes the fields shown in FIG. 4A. In other embodiments, alias sets have attribute sets 420 that include different fields. For example, any action on an object taken by a thread can be represented by attribute fields within the alias set.

The alias analysis builds a description of aliasing behavior in a procedure using alias sets. An alias set is defined for every local variable, each formal parameter, and each return value of each procedure, and one is also assigned to each global variable (including static fields, string literals, and array constants) in the program. If at any time during execution of the procedure, two of these can denote the same value, they are aliased, and their alias sets are merged. The result is a single, common, alias set that associates multiple expressions. For example, if within procedure 300, code 340 aliases r, x, and y, as in the previous example, then the alias sets for r, x, and y are merged by the alias analysis. Prior to the alias analysis of the procedure, each of r, x, and y had separate alias sets. As a result of the alias analysis of the procedure, the separate alias sets are merged into a single alias set, and the single alias set represents r, x, and y.

Alias sets are examples of"equivalence class representatives." In other words, the alias analysis uses an equivalence class representation where the equivalence classes are described by alias sets. Alias sets allow modeling of expression aliasing in a flow-insensitive manner by grouping potentially aliased expressions into equivalence classes, and synchronization behavior is modeled as attributes of these equivalence classes.

Alias sets having the global field set are termed "global alias sets." When the alias analysis begins, only alias sets associated with global variables and objects are global alias sets. As alias sets are merged, more variables and objects can become associated with global alias sets. The same naming convention is used for "synchronized alias sets." A synchronized alias set is an alias set that has the "synchronized" field set.

Two alias sets are merged by merging the field maps (recursively merging the alias sets of fieldnames present in both maps), and merging the remaining attributes (under the usual set and boolean lattices, as appropriate). In addition, merging a global alias set with a non-global, synchronized alias set augments the syncThreads set of the result with the thread allocation sites reaching the current method. The process of merging alias sets is termed "unification" and is described more fully below.

An operation called "new instance creation" is defined that allows the abstraction of the aliasing and synchronization properties of an alias set. New instance creation returns an alias set isomorphic to an existing one, in which only global alias sets are shared between the old and new instances.

FIG. 4B shows an embodiment of an alias context. Alias contexts are a collection of alias sets, and are used to model aliasing behavior at procedure boundaries (and call sites) in a program. AliasContext data structure 450 includes alias sets, or references thereto, that describe the aliasing behavior of formal parameters and return values of procedures. Specifically, aliasContext data structure 450 includes alias sets 460 corresponding to formal parameters, and alias sets 470 corresponding to return values. In the Java synchronization optimization embodiment, the alias context data structure models the aliasing and synchronization behavior of parameter, normal result, and exception result values transmitted between call sites and methods. It is a tuple:

$$\text{aliasContext}::=<<\alpha_0, \ldots, \alpha_n>, \alpha_r, \alpha_e>$$

where $\alpha_i$, $\alpha_r$, and $\alpha_e$ are alias sets corresponding to the parameter, return, and exception values. Alias contexts are used to represent the information both for methods (in which case the $\alpha_i$ represent formal values received from the caller, and $\alpha_r$ and $\alpha_e$ represent values returned to the caller) and for call sites (in which case the $\alpha_i$ represent actual values transmitted to the callee, and $\alpha_r$ and $\alpha_e$ represent values returned by the callee). In the former case, the aliasContext data structure is termed a "method context," and in the latter case, the aliasContext is termed a "site context."

Like alias sets, alias contexts support unification and new instance creation. Alias context unification is the pointwise extension of alias set unification to tuples. The alias context returned by new instance creation preserves (recursively) all relationships between the original $\alpha_i$, $\alpha_r$, and $\alpha_e$.

Prior to the alias analysis, method contexts include separate alias sets for each formal parameter and return value. After the alias analysis, some of the alias sets may have been unified with each other or with global alias sets, depending on the aliasing behavior of the method. Method contexts that result from the alias analysis are termed "alias signatures" because they describe the aliasing behavior of the method.

The aliasing behavior of the method can include formal parameters or return alues being aliased to each other, to global variables, or to both. For example, when a global variable is aliased to the return value, the method context includes an alias set for the return value that has been unified with the alias set for the global variable.

The alias analysis includes an inter-procedural portion and an intra-procedural portion. These two portions are now described.

Inter-procedural Portion of Alias Analysis

The inter-procedural portion of the alias analysis associates each global value with an alias set and each method with a method context. It begins by binding each global value (static field, string literal, or array constant) to a new alias set with the global attribute set to true. It also constructs initial alias sets for compiler-generated runtime data structures whose initialization is not explicit in the program code (class objects, interning and reflection tables, etc). The analysis then partitions the static call graph into strongly connected components (SCCs) and traverses them in bottom-up topological order. Processing an SCC consists of creating an initial method context object for each method in the SCC, then applying the intra-procedural portion of the alias analysis to each method individually.

Intra-procedural Portion of Alias Analysis

The intra-procedural portion of the alias analysis ensures that any aliasing or synchronization by the method and its callees is appropriately represented in the method context and global alias sets. It begins by associating each formal parameter variable with the corresponding formal alias set from the method context. It then walks the method's statements, unifying alias sets using the unification rules listed below in Table 1.

Only statements that modify reference variables or values are processed. Primitive operations that induce aliasing cause the alias sets of potentially aliased expressions to be unified. For example, the assignment x.f=y (where x and y are local variables) causes the analysis to unify y's alias set with the alias set returned by xas.fieldmap(f), where "xas" is the alias set for x. Similarly, analyzing "throw z" unifies z's alias set with those of all relevant handlers (including the returned-exception value e of the method context if z could be uncaught by the method).

As statements are processed, the synchronization behavior is also recorded in alias sets. For example, if an object is synchronized within a method, the synchronized field is set in the corresponding alias set. When the alias set for the synchronized object is unified with another alias set, the resulting alias set has the synchronized field set. In one embodiment, synchronization operations in Java can be represented as monitorEnter and monitorExit statements that mark the beginning and end of a synchronized block of code. When they are encountered, the analysis sets the synchronized property of their argument alias set. In addition, if the argument alias set is marked as global, all thread allocation sites reaching the current method are added to the argument alias set's syncThreads property. Suppose x and r are aliased and the alias set reflects this fact. If x is the target of a Java synchronization operation, the alias set for x is marked as being synchronized, but since x and r are aliased, r is also marked as being synchronized.

As statements are processed, unification of alias sets can change the value of attribute fields in alias sets. For example, when the alias set for a global object is unified with another alias set, the resulting alias set has the global field set, and unification of a global alias set with a non-global synchronized alias set augments the syncThreads field of the result with the thread allocation sites reaching the current method.

Methods can be either "leaf" methods or "non-leaf" methods. Methods that do not call other methods are represented by leaf nodes in the call graph, and are called leaf methods. Non-leaf methods are methods that call other methods, and are represented by non-leaf nodes in the call graph. The intra-procedural portion of the alias analysis is applied to leaf methods prior to being applied to non-leaf methods that call them. For each leaf method, the intra-procedural portion of the alias analysis is complete after walking the statements, and an alias signature is created as described above.

For non-leaf methods, the intra-procedural portion of the alias analysis uses alias signatures of called methods for use in constructing alias signatures for the non-leaf methods. At method invocations (call sites), the analysis constructs a site context S whose formal, return, and exception alias sets correspond to the actual, result, and relevant exception alias sets at the call site. It then iterates over the methods invoked by the call site, performing one of the following two operations depending on whether the invoked method is a recursive target or a non-recursive target:

1. For non-recursive targets: The analysis computes a new instance M' of the method context M and unifies it with the site context S, demonstrated by the following pseudo-code.

```
M'=newInstance(M)
unify(S, M')
```

This has the combined effect of (1) reflecting callee-side aliases to the call site, and (2) propagating callee-side properties to the call site. Creating a new instance each time a method is applied prevents the accumulation of call-site-specific information in the method context, allowing context-sensitive analysis. For example, if a method g is called from three different methods, then the original alias signature for g can remain undisturbed while three new instances can be created, one for unification with each of the different call sites.

The pseudo-code above shows two separate actions: one for creating a new instance of the method context M, and one for unifying S and M'. In another embodiment, these actions are accomplished in a single pass by performing a parallel walk of M and S. Attributes of alias sets in M are explicitly copied to corresponding alias sets in S, while aliases holding in M are transferred to S by performing unification on corresponding elements in S. This is shown in the pseudo-code below.

Pseudo-code for Parallel Walk of M and S:

Construct a mapping F (initially empty) from alias sets in M to alias sets in S. Perform a parallel canonical-order walk of the alias sets m of M and the alias sets s of S

```
if s is null, construct a new alias set s' in the current
    position in S and set s=s'
if m is global,
    unify m and s
else if F is defined on m and F(m)=t
    unify(t,s)
else
    propagate attributes from m to s
    set F(m) s
```

2. For recursive targets: In this case, the analysis unifies the method context M and site context S without first computing a new instance of method context M. While this introduces context insensitivity at recursive call sites, it can have a large performance benefit in that the analysis does not need to iterate over the entire SCC until a fixed point is reached.

Figure 5:
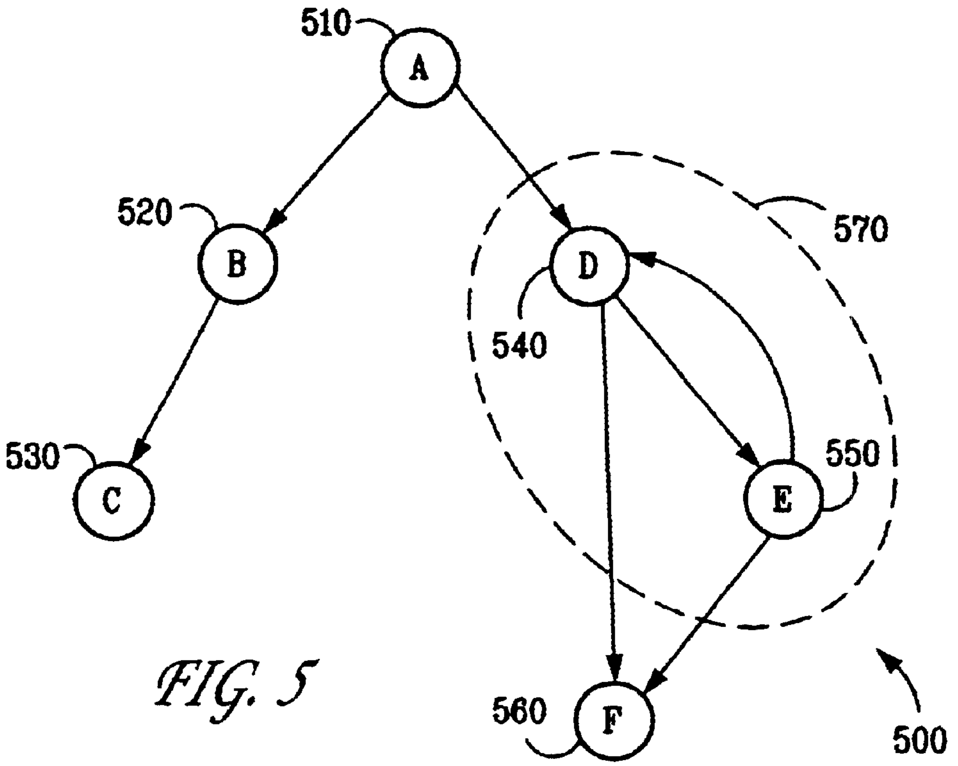
FIG. 5 is a call graph having a recursive target.

FIG. 5 shows a call graph having recursive targets. Call graph 500 includes methods 510, 520, 530, 540, 540, 550, and 560, also labeled as methods A, B, C, D, E, and F, respectively. At the call site in D that invokes E, E is a recursive target because it may in turn invoke D. Similarly, at the call site in E invoking D, D is a recursive target because it may invoke E. When the intra-procedural portion of the alias analysis is performed on method E, an alias signature is not available for method D, and vice versa, because methods D and E can call each other.

Fixed point iteration can be used to arrive at the alias signatures for methods D and E, but this can be very time consuming. In one embodiment, the alias analysis does not use fixed point iteration. Methods that create a cycle are identified, and for each method in the cycle, direct unification of site contexts and method contexts are made, as opposed to making a new instance of the method context as is done in the non-recursive case. For example, in the example call graph of FIG. 5, methods D and E create a cycle shown as cycle 570. As methods are processed from the bottom-up in call graph 500, method F is first processed and an alias signature for method F is created. Method F is called by both methods D and E. If method E is processed next, a new instance of the method context of method F is created and used at the call site within method E. At the D call site within method E, a method context for method D is created and used at the call site without first creating a new instance. This creates an approximation of the behavior of method E because the alias signature of method D is not yet complete when it is used.

When method D is processed, the method context for method E is used directly at the call site within method D, and the appropriate unifications are made between formal parameters and actual arguments. At this point in the analysis, cycle 570 has been combined such that the method context for method D represents all possible aliasing that can occur in the combination of recursively called methods D and E. If more than one method calls either of method D or E, new instances can be made when those methods are processed.

Direct unification rather than unifying new instances creates a conservative estimate of the runtime aliasing behavior in return for less processing time when performing the alias analysis. Direct unification, by not requiring fixed point iteration, provides a significant speed advantage over fixed point iteration in part because each method need only be traversed once rather than multiple times.

After a method has been analyzed, the analysis drops the reference to the local variable mapping, allowing all alias sets not escaping the method's stack frame to be reclaimed. Subsequent phases requiring information about the method's local variables can reconstitute it by re-executing the intra-procedural portion of the alias analysis on the method.

At the completion of the alias analysis, every method in the program has been processed and has had an alias signature generated therefor. Each global variable or object has been associated with an alias set, many of which have been unified with other alias sets that represent escaping objects. The method context represents a polymorphic method summary that includes equivalence class based representations of objects (alias sets). The representation is constructed in a single pass without fixed point operations, and enables context-sensitive analysis and specialization.

As previously described, unification is performed according to a set of rules as shown below in Table 1 using a generic register transfer notation. These rules can be applied to any programming language.

TABLE 1

| Domains | |
|---|---|
| $v \in V$ | local variables |
| $g \in G$ | globals (constants, static fields) |
| $f \in F$ | field names |
| $a, r, e \in A$ | alias sets |
| $mc, sc \in C$ | method, site contexts |
| $m, p \in M$ | methods |
| $s \in S$ | thread creation sites |
| $t \in T$ | types |
| **Analysis State** | |
| $GAS : G \rightarrow A$ | alias set lookup for globals |
| $AS : V \rightarrow A$ | alias set lookup for locals |
| $MC : M \rightarrow C$ | method context lookup |
| $CALLEES : M \times V \rightarrow 2^M$ | method target lookup |
| $SCC : M \rightarrow 2^M$ | SCC lookup |
| $TC : M \rightarrow 2^S$ | thread creation site lookup |

Unification Rules

| statement | action |
|---|---|
| $v_0 = v_1$ | unify($AS(v_0)$, $AS(v_1)$) |
| $v_0 = (t)\ v_1$ | |
| $v = g$ | unify($AS(v)$, $GAS(g)$) |
| $g = v$ | |
| $v_0 = v_1.f$ | unify($AS(v_0)$, $AS(v_1)$.fieldmap(f)) |
| $v_1.f = v_0$ | |
| $v_0 = v_1$ [] | unify($AS(v_0)$, $AS(v_1)$.fieldmap($ELT)) |
| $v_1$ [] = $v_0$ | |
| $v = f(v_0, \ldots, v_n)$ | $\forall v_i$ unify($AS(v)$, $AS(v_i)$) |
| v = new T | no action |
| return v | unify(AS(v), r) |
| throw v | unify(AS(v), e) |
| monitorEnter v | AS(v).synchronized = true |
| monitorExit v | if AS(v).global<br>AS(v).syncThreads =<br>AS(v).syncThreads $\cup$ TC(m) |
| v = call $p(v_0, \ldots, v_n)$ | let sc = <<$AS(v_0)$, . . . , $AS(v_n)$>, AS(v), e><br>$\forall p_i \in$ CALLEES(p, $v_0$)<br>let mc = $MC(p_i)$<br>if SCC(m) $\neq$ SCC($p_i$)<br>let mc' = newInstance(mc)<br>unify(sc, mc')<br>else<br>unify(sc, mc) |

PHASE 3: Specialization and Transformation

The third optimization phase propagates alias set attribute information from call sites to callees. In the Java synchronization optimization embodiment, synchronization information is propagated from call sites to callees, which is used to remove or simplify synchronization operations in callees. It also constructs specialized versions of methods where different call sites allow distinct simplifications.

Like alias analysis discussed above, specialization and transformation includes an inter-procedural portion and an intra-procedural portion. Unlike alias analysis, which performs operations starting at the bottom of the call graph and moves upward, specialization and transformation traverses the call graph from the top down.

Inter-procedural Portion of Specialization and Transformation

The inter-procedural analysis processes SCCs in a top-down topological order while maintaining per-SCC queues of specialization requests (in the form of (method, methodContext) pairs). The analysis iteratively executes the intra-procedural portion of the analysis over all specialization requests for methods in a given SCC until all have been satisfied.

Intra-procedural Portion of Specialization and Transformation

Figure 6:
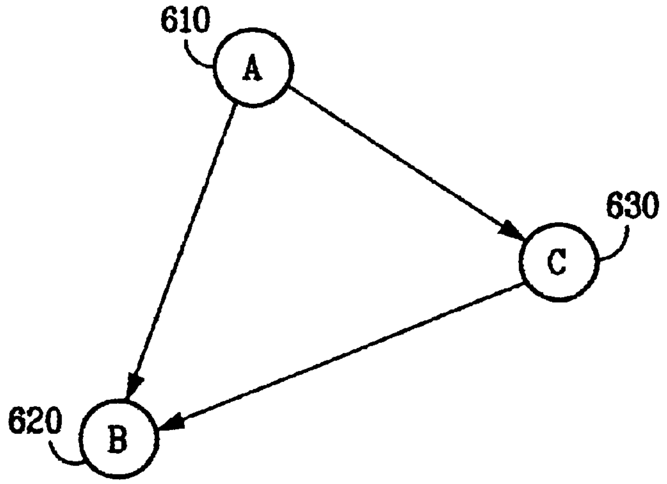
FIG. 6 is a call graph showing a procedure callable by more than one other procedure.

The intra-procedural portion of the analysis both optimizes the method body (removing or simplifying synchronization operations and redirecting calls to specialized targets) and requests the creation of specialized method bodies. In this portion, the call graph is traversed top-down to determine to what extent the lower level procedures can be optimized. FIG. 6 shows a section of a call graph. Call graph 600 shows procedures 610, 620, and 630, also labeled as procedures A, B, and C, respectively. Procedure A can call procedure B or procedure C, and procedure C can call procedure B. During the analysis, the body of procedure B, as opposed to just its method context, may be cloned, once for being called by procedure A and once for being called by procedure C, and each can be optimized separately. One of the cloned procedures may have more synchronization operations removed or otherwise modified than the other.

Given a (method, methodContext) pair, the analysis begins by executing the intra-procedural analysis of Phase 2 (alias analysis), associating each local variable with an alias set. It then walks the method's statements, rewriting synchronization operations and call sites as follows.

Synchronization operations. Given a statement of the form monitorEnter(o) or monitorExit(o), where o has alias set oas, the analysis checks to see if oas is contention free. An alias set is contention free if the SyncThreads field includes at most one thread, and that thread is a singleton thread. If oas is contention free, the statement is removed and, if the program is multi-threaded (e.g., Phase 1 found more than one thread allocation site), inserts a memory barrier primitive so that later optimizations will obey the Java memory semantics at this point.

Call sites. During the top-down analysis, when a call site is encountered, the alias signature for each callee is consulted. To determine whether a specialized version of a callee is necessary, a copy of the callee's alias signature is made, and alias set attributes are propagated from the site context to the alias signature (which is a method context that has undergone the alias analysis of Phase 2). The term "procedure signature" is used in this description to describe method contexts that have received call site information propagated from a site context. The procedure signature is compared to other procedure signatures produced from other call sites of the same method. If the procedure signature has been encountered before, a previous copy of the procedure may be used. Otherwise, a new copy of the method is created and a request to specialize the copy on the procedure signature is enqueued. The procedure signature is different from an alias signature as described above. A procedure signature includes attribute information propagated into the method context from a call site, whereas an alias signature does not. The following actions are employed in determining whether to create a new copy of a method:

1. Propagate the alias set attributes from the actual values at the call site to the alias sets for the formal parameters of the callee. Given a call statement, the analysis constructs a site summary S from the actual, return, and reachable exception handler alias sets. For each target method with method context M, it constructs a new instance M' of M and then walks M' and S in parallel; for each alias set m' in M' that is synchronized, the syncThread attribute of the corresponding alias set s in S is added to the syncThread attribute of m'
2. Create a new procedure signature of the method after the attribute bits have been propagated, and compare it to both M and the method contexts of all existing or pending specializations of the target method, under the condition that two alias sets match if their contention-free status is the same. Two procedure signatures match if the contention-free status of corresponding alias sets are the same, and are considered unique if the contention-free status of any alias sets are different between the two.
3. If the new procedure signature has been encountered before, modify the call site to invoke the copy of the procedure previously generated having the same procedure signature; and
4. If the new procedure signature has not been encountered before, create a new copy of the method for later optimization and enqueue a request to specialize the copy on the new procedure signature. The call site is also modified to invoke the appropriate specialized procedure.

Java compilers create byte code. Byte code can also be created in other programming languages such as C or C++. In these languages, the alignment of monitorEnter instructions and monitorExit instructions are not necessarily well behaved. It is up to the optimizer to find correlated groups of monitorEnter and monitorExit operations to removed.

MonitorEnter/monitorExit correspondences that do not span method boundaries are easily handled by the Java synchronization optimization embodiment. Within a method, all potentially aliased objects have identical syncThreads attributes, ensuring that all synchronization operations on a particular object will be preserved or eliminated as a whole.

Correspondences that span multiple procedures are more difficult, as removing or preserving a synchronization operation in one method may require the removal or preservation of a corresponding operation in another method. The specialization strategy described above handles this by aggressively specializing callees with respect to the contention status of values at call sites, ensuring that caller and (specialized) callee methods will always agree on the removal/preservation choice for any runtime value.

Less aggressive specialization strategies, in which contexts inducing differing contention properties can share a common specialization, must place additional restrictions on synchronization removal. In one embodiment, a well-formedness analysis is performed to determine whether the instructions are properly paired at runtime. A synchronization operation on a local variable or constant expression "e" is considered well-formed if, for all paths from method entry to method exit, the number of monitorEnter operations performed by the method (not including callees) on e equals the number of monitorExit operations performed on e, and if there is no point where the number of monitorExit operations on e could exceed the number of monitorEnter operations on e. This property can be computed using standard forward dataflow analysis techniques over the flat integer lattice. See Steven S. Muchnick, "Advanced Compiler Design and Implementation," pp. 217–266, Morgan Kaufman, 1997. Synchronization removal can then be restricted to methods where all synchronization operations in the method and in all of its (transitive) callees are well formed.

The Java threading model supports event notification via the Object.wait, Object.notify, and Object.notifyAll methods, all of which require that their "this" argument be locked (otherwise an exception is thrown). In one embodiment, this behavior is preserved notwithstanding synchronization elimination by using an additional attribute field in the alias set. This additional field is the "notified" field.

When a notification method is invoked on an object, a boolean notified field in the object's alias set is set to true. The rest of the analysis proceeds as normal. When the analysis finds an otherwise removable synchronization operation whose alias set has notified=true, it replaces the operation with a specialized version that performs enough bookkeeping to satisfy the notification methods, without actually performing any machine-level synchronization operations. The code that performs the bookkeeping creates a lock object having information that creates the illusion that the object being notified is locked. When the notify method checks the lock object, it proceeds as if the object being notified were locked, when in fact it is not.

An example is now presented to demonstrate the operation of the Java synchronization optimization embodiment. FIG. 7 shows part of an example of a vector class and three of its clients immediately prior to synchronization optimization. The methods are shown in an intermediate code with a Java-like syntax. Virtual calls have been statically bound, and each statement executes a single operation. In addition, explicit monitorEnter, monitorExit, and catch operations are used to implement the synchronized method SimpleVector.elementAt and the synchronized block encircling the ellipsis in method test3. The results of Phase 1 are shown as comments: the example makes the assumption that both T1 and T2 represent single-instance thread allocation sites.

Phase 2 begins by assigning a new alias set $\alpha_0$=<{ }, false, { }, true> to the static variable SimpleVector.v, and computes the bottom-up schedule <init>, elementAt, test0, test1, test2. The method context constructed for <init> is <<$\alpha_1$>, ⊥, $\alpha_3$>, where $\alpha_1$=<{elements→$\alpha_2$}, false, { }, false> and $\alpha_2$ and $\alpha_3$ have default attributes ({ }, false, { }, false). This context indicates that the formal parameter may have a field named "elements" described by $\alpha_2$, and there is no return value. Neither the formal, any value reachable from it, nor any thrown exception can be synchronized by <init>.

The method context for elementAt is <<$\alpha_4$, ⊥>, $\alpha_6$, $\alpha_7$>, where $\alpha_4$=<{elements→$\alpha_5$}, true, { }, false>, $\alpha_5$=<{$ELT→$\alpha_6$}, false, { }, false>, and $\alpha_6$ and $\alpha_7$ have default attributes. In this case, the first parameter may be synchronized, and the contents of its "elements" array may be returned.

The intra-procedural portion of the alias analysis on test1 finds that the value of variable v1 may be synchronized, but does not escape either into test1's method context or a global alias set. Analyzing the first three statements of test2 yield a similar configuration of locals, with v2 bound to $\alpha_8$=<{elements→$\alpha_9$}, true, { }, false>, $\alpha_9$=<{$ELT→$\alpha_{10}$}, false, { }, false>, and o2 bound to $\alpha_{10}$, where $\alpha_{10}$ has default attributes. The assignment SimpleVector.v=v2 unifies $\alpha_8$ with $\alpha_0$, producing (due to the unification of global and a non-global alias sets) the alias set $\alpha_0$=$\alpha_8$=<{elements→$\alpha_9$}, true, {T1}, true> where $\alpha_9$=<{$ELT→$\alpha_{10}$}, false, { }, true> and $\alpha_{10}$=<{ }, false, { }, true>. At this point, the analysis has determined that v and v2 may be aliases holding a value that escapes and is synchronized by the thread allocated at site T1, and that the value in o2 escapes but is not synchronized.

The analysis of test3 binds v3 to $\alpha_0$. The application of elementAt marks $\alpha_0$ as synchronized under the thread allocated at T2 and binds the variable o3 to $\alpha_{10}$. The synchronization of o3 causes $\alpha_{10}$ to be marked as synchronized, but only by T2. At the end of phase 2 (alias analysis), the method contexts for <init> and elementAt are as given above, while the alias set for SimpleVector.v, v2, and v3 is $\alpha_0$=<{elements→$\alpha_9$}, true, {T1, T2}, true>, where $\alpha_9$=<{$ELT→$\alpha_{10}$}, false, { }, true> and $\alpha_{10}$=<{ }, true, {T2}, true>.

Phase 3 (specialization and transformation) makes no changes to test1, as the syncThreads attribute of v1's alias set (and its elements) matches that of this1 and this2's alias sets. The same is true for the invocation of <init> in test2. Since the syncThreads attribute of v2's alias set denotes multiple threads and the corresponding alias set in elementAt's context does not, test2's call to elementAt is rebound to a copy of the procedure, elementAt2, with context <<$\alpha_{11}$, ⊥>, $\alpha_{13}$, $\alpha_{14}$>, where $\alpha_{11}$=<{elements→$\alpha_{12}$}, true, {T1, T2}, false>, $\alpha_{12}$=<{$ELT→$\alpha_{13}$}, false, { }, false>, and $\alpha_{13}$ and $\alpha_{14}$ have default attributes. In other words, elementAt2 is a specialization of elementAt that preserves synchronization behavior on the formal parameter this2.

The call to elementAt in test3 is also retargeted to elementAt2. Local o3 is found to have the alias set $\alpha_{10}$=<{ }, true, {T2}, true>, which is synchronized, but only by a singleton thread. This means that all three synchronization operations on o3 are eliminable, so they are replaced by memory barrier primitives.

The <init> method is not processed because it has neither synchronization operations nor callees. Processing of elementAt finds that this2 cannot be synchronized (recall that both invocations that passed synchronized arguments were redirected to elementAt2), and successfully replaces the synchronization operations on this2 with barriers. The alias set $\alpha_{11}$ in the context for elementAt2 is synchronized by two threads, causing all three synchronization operations to be preserved.

In one embodiment, compile time costs are reduced by avoiding work that cannot enable the removal of synchronization operations. During the alias analysis of phase 2, methods that cannot transitively execute synchronization operations are identified. Such methods do not require removal of synchronization operations or retargeting of call sites, and thus can be ignored in the specialization and transformation of phase 3.

In another embodiment, memory usage is lowered, and unification, comparison, and new instance costs are reduced by compressing method contexts. An alias set can be removed from a method context if: 1) it is not synchronized; 2) it is not global; 3) it only appears once in the context; and 4) all of its elements are removable. Restrictions 2 and 3, above, ensure that aliases are propagated from callees to callers.

CONCLUSION

The method and apparatus of the present invention remove unnecessary synchronization operations from statically compiled Java programs. Synchronization operations can be eliminated even on objects that escape their allocating threads. Compact, equivalence-class-based polymorphic summaries eliminate the need for fixed point operations during the analysis.

Although the specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the present invention. It is to be understood that the above description is intended to be illustrative, and not restrictive. Combinations of the above embodiments and other embodiments will be apparent to those of skill in the art upon reviewing the above description. The scope of the invention includes any other applications in which the above structures and fabrication methods are used. Accordingly, the scope of the invention should only be determined with reference to the appended claims, along with the full scope of equivalents to which such claims are entitled.

I claim:

1. A method for determining if a thread can perform an action of interest on an object denoted by a particular program expression, the method comprising:

performing a thread closure analysis to determine the closure of code potentially executed by the thread;

performing an alias analysis for each procedure in the closure of code to determine a polymorphic summary of each procedure, wherein the polymorphic summary includes equivalence class representatives of formal parameters at the procedure boundary;

utilizing the polymorphic summary to specialize each procedure in the closure of code; and searching the specialized procedures for occurrences of the action of interest performed on objects represented by the same equivalence class representative as the object.

2. The method of claim 1 wherein utilizing the polymorphic summary to specialize each procedure comprises:

when a procedure in the closure of code is called from more than one call site, creating a procedure signature of the procedure at each call site by transferring attributes from equivalence class representatives at the call site to equivalence class representatives of the polymorphic summary; and when the procedure signature is unique with respect to other procedure signatures for the same procedure, copying the procedure.

3. The method of claim 1 wherein the closure of code is represented by a call graph and performing an alias analysis comprises:

for each formal parameter and each return value of each procedure, creating an equivalence class representative;

partitioning the call graph into strongly connected components, and traversing the strongly connected components in bottom up topological order and performing an intra-procedural analysis on each procedure within each strongly connected component.

4. The method of claim 3 further comprising:

associating one of the equivalence class representatives for each of a plurality of global variables; and whenever a global variable is associated with a return value, unifying an equivalence class representative of the return value with an equivalence class representative of the global variable.

5. The method of claim 3 wherein the intra-procedural analysis comprises:

selectively unifying equivalence class representatives according to a set of rules.

6. The method of claim 3 wherein creating an equivalence class representative comprises:

creating an alias set capable of being associated with a plurality of equivalent objects and including at least one attribute field that denotes whether the action of interest is performed on an object associated with the alias set.

7. The method of claim 6 wherein the at least one attribute field includes:

a first field that indicates whether one of the plurality of equivalent objects has the action of interest performed thereon;

a second field that indicates whether one of the plurality of equivalent objects can be reached from a reference constant or static field; and a third field including a set of threads capable of performing the action of interest on any of the plurality of equivalent objects.

8. The method of claim 7 wherein the first field indicates whether any of the equivalent objects can be locked.

9. The method of claim 6 wherein the action of interest is an operation that locks the object.

10. The method of claim 6 further comprising:

for each object in the plurality of equivalent objects, determining a set of threads that can perform the action thereon, and from which the object escapes.

11. The method of claim 1, wherein performing the alias analysis comprises generating an alias signature associated with the polymorphic summary, wherein the alias signature shows whether, within each procedure, formal parameters or return values of the method are reachable by each other or by any global objects.

12. The method of claim 11, wherein generating the alias signature for each procedure comprises:

traversing a call graph from leaf nodes upward;

for each leaf method, creating a separate equivalence class representative for each formal parameter and return value of the leaf method, and grouping the equivalence class representatives into a method context for the leaf method; and conditionally unifying different ones of the equivalence class representatives based on a set of rules to create the alias signature.

13. The method of claim 11, wherein generating the alias signature for each procedure comprises:

traversing a call graph from leaf nodes upward;

when creating an alias signature for a non-leaf method in the call graph, identifying a called method called by the non-leaf method;

creating a new instance of an alias signature for the called method; and merging the site context corresponding to the method call site with the new instance of the alias signature.

14. The method of claim 11, wherein generating the alias signature for each procedure comprises:

traversing a call graph from leaf nodes upward;

when creating an alias signature for a non-leaf method in the call graph, identifying a called method called by the non-leaf method;

when the called method does not have an alias signature associated therewith, creating a method context for the called method; and merging the site context corresponding to the method call site with the method context.

15. The method of claim 12, further comprising:

removing an equivalence class representative from the alias signature when it can be shown that no objects associated with the equivalence class representative are synchronized or escaping, the equivalence class representative only appears once in the alias signature, and all elements of the equivalence class representative are removable.

16. The method of claim 12, wherein generating the alias signature for each procedure includes creating alias signatures for each non-leaf method and wherein creating an alias signature for a non-leaf method comprises:

creating separate equivalence class representatives for each formal parameter and return value of the non-leaf method;

grouping the separate equivalence class representatives for the non-leaf method into a method context for the non-leaf method;

creating separate equivalence class representatives for each local variable in the non-leaf method;

within the non-leaf method, finding method call sites associated with methods already having corresponding alias signatures; and for each call site, merging the site context corresponding to the call site with the alias signatures corresponding to the procedures invoked by the call site.

17. The method of claim 12, wherein the equivalence class representatives include attribute fields describing the synchronization behavior of an object associated therewith, and further comprising:

traversing the call graph in a top-down order; and for each method in the call graph, finding method call sites, propagating values of attribute fields into alias signatures of called methods to create procedure signatures, and specializing the called methods if procedure signatures are unique.

18. The method of claim 1, further comprising performing optimization on the procedures, the optimization comprising removing a portion of code that performs a synchronization operation of the object.

19. The method of claim 18, wherein performing the optimization further comprises when the one object has a notification method invoked thereon, not removing code that satisfies the notification method.

20. The method of claim 1, further comprising performing an optimization that comprises removing code locks objects and not removing code that performs enough bookkeeping to satisfy notify operations.

21. A computer readable medium having stored thereon computer-executable components comprising:

a thread closure component for determining a subset of procedures in a call graph reachable by a thread associated with a thread allocation site;

a procedure summary component for generating polymorphic summaries of procedures in the call graph; and a specialization component for specializing procedures separately when separate optimizations for each procedure can be performed.

22. The computer readable medium of claim 21, the specialization component comprising:

a component for removing synchronization operations when an object can only be synchronized by a single thread.

23. A computer readable medium having stored thereon a data structure comprising:

one equivalence class representative for each formal parameter and each return value of a procedure, wherein each of the equivalence class representatives includes at least one attribute describing whether any objects associated therewith are reachable from a global object.

24. The computer readable medium of claim 23 wherein the at least one attribute includes a set of threads that can synchronize an object associated with the equivalence class representative.

25. The computer readable medium of claim 23 wherein the at least one attribute includes:

a field indicating whether any object associated with the equivalence class representative is subject to a synchronization operation; and a field indicating whether any object associated with the equivalence class representative is subject to a notification operation.

26. A method of performing an alias analysis over a call graph, the method comprising:

for each procedure in the call graph, creating an equivalence class representative for each formal parameter and return value, and grouping the equivalence class representative for each formal parameter and return value into a polymorphic summary;

traversing the call graph upward starting at leaf nodes, and unifying equivalence class representatives whenever expressions associated with distinct equivalence class representatives become aliased; and traversing the call graph downward starting at a root procedure, and specializing procedures using the polymorphic summaries.

27. The method of claim 26 wherein traversing the call graph upward further comprises:

determining whether a procedure can transitively execute an action of interest; and if the procedure cannot transitively execute the action of interest, then removing the procedure from consideration for specialization when traversing the call graph downward.

28. The method of claim 26 further comprising creating an equivalence class representative for every global object.

29. The method of claim 26 wherein the equivalence class representatives include attributes, and wherein specializing comprises:

propagating attributes at a procedure call site into attributes of a polymorphic summary; and if a resulting procedure signature is new, duplicating the method; and modifying the duplicated method as permitted by the new procedure signature.

30. A computer-readable medium having computer-executable components comprising:

an equivalence class representative generation component for creating an equivalence class representative for each formal parameter and return value of each procedure in a call graph, and for grouping the equivalence class representative for each formal parameter and return value into a polymorphic summary of the procedure;

a procedure summary generation component for traversing the call graph upward starting at leaf nodes, and unifying equivalence class representatives whenever expressions associated with distinct equivalence class representatives become aliased; and a specialization component for traversing the call graph downward starting at a root procedure, and specializing procedures using the polymorphic summaries.

* * * * *